US010421448B2

(12) United States Patent
Kepley

(10) Patent No.: US 10,421,448 B2
(45) Date of Patent: Sep. 24, 2019

(54) RETAINING VALVE FOR A RAIL CAR BRAKE SYSTEM

(71) Applicant: Amsted Rail Company, Inc., Chicago, IL (US)

(72) Inventor: Ryan Kepley, Greenville, SC (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 182 days.

(21) Appl. No.: 15/606,443

(22) Filed: May 26, 2017

(65) Prior Publication Data

US 2018/0339691 A1 Nov. 29, 2018

(51) Int. Cl.

| | |
|---|---|
| *B60T 15/54* | (2006.01) |
| *B60T 15/02* | (2006.01) |
| *B60T 13/26* | (2006.01) |
| *B61H 1/00* | (2006.01) |
| *B60T 15/30* | (2006.01) |
| *B60T 13/66* | (2006.01) |
| *B60T 17/22* | (2006.01) |

(52) U.S. Cl.
CPC .............. *B60T 15/54* (2013.01); *B60T 13/26* (2013.01); *B60T 13/665* (2013.01); *B60T 15/022* (2013.01); *B60T 15/304* (2013.01); *B60T 17/228* (2013.01); *B61H 1/00* (2013.01)

(58) Field of Classification Search
CPC ....... Y10T 137/6866; Y10T 137/87257; Y10T 137/6031; Y10T 137/6035; Y10T 137/86743; Y10T 137/86751; Y10T 137/86541; Y10T 137/86863; Y10T 137/87378; Y10T 137/87386; Y10T 137/87523; B60T 15/54; B60T 15/022; B60T 15/304; B60T 13/26; B60T 13/665; B60T 17/228; B60T 15/04; B60T 15/048; B60T 15/185; B61H 1/00
USPC ......... 251/315.01, 310, 208, 207; 137/269.5, 137/270, 329.01
See application file for complete search history.

(56) References Cited

U.S. PATENT DOCUMENTS

| | | | | | |
|---|---|---|---|---|---|
| 2,048,328 | A | * | 7/1936 | Farmer ................... | B60T 15/54 303/79 |
| 2,204,796 | A | * | 6/1940 | Farmer ................... | B60T 15/54 137/381 |
| 3,526,248 | A | * | 9/1970 | Billeter ................... | B60T 15/02 137/599.05 |
| 3,532,116 | A | * | 10/1970 | Huie ....................... | B60T 15/54 137/550 |

(Continued)

*Primary Examiner* — Jessica Cahill
(74) *Attorney, Agent, or Firm* — Dority & Manning, P.A.

(57) ABSTRACT

A retaining valve includes an inlet and a valve member downstream from the inlet, wherein the valve member has first, second, and third positions. A first passage through the valve member allows fluid flow through the retaining valve when the valve member is in the first position. A second passage through the valve member allows fluid flow through the retaining valve when the valve member is in the second position. A third passage through the valve member allows fluid flow through the retaining valve when the valve member is in the third position. A slide moves with respect to the valve member in response to pressure at the inlet. A spring engaged with the slide biases the slide toward the inlet. A seal located at an axial midpoint of the slide prevents flow through the third passage when pressure at the inlet is less than a predetermined pressure.

14 Claims, 7 Drawing Sheets

(56) References Cited

U.S. PATENT DOCUMENTS

| | | | | |
|---|---|---|---|---|
| 3,532,117 A | * | 10/1970 | Racki | B60T 15/54 |
| | | | | 137/550 |
| 3,653,406 A | * | 4/1972 | Racki | B60T 15/54 |
| | | | | 137/599.18 |
| 3,794,071 A | * | 2/1974 | Scott | F16K 11/0873 |
| | | | | 137/599.18 |
| 5,657,790 A | * | 8/1997 | Mohn | B65D 83/42 |
| | | | | 137/270 |
| 6,164,328 A | * | 12/2000 | Huber, Jr. | B60T 13/406 |
| | | | | 137/599.17 |
| 6,789,567 B2 | * | 9/2004 | Meyer | F16K 15/142 |
| | | | | 137/269.5 |

* cited by examiner

RETAINING VALVE FOR A RAIL CAR BRAKE SYSTEM

FIELD OF THE INVENTION

The present invention generally involves a retaining valve for a rail car brake system.

BACKGROUND OF THE INVENTION

Conventional trains typically rely on a pneumatic brake system to provide reliable braking. Although individual brake systems may vary slightly, they typically include a main reservoir, located on a locomotive, that supplies pressurized air through a brake pipe to each rail car connected in series to the locomotive. The brake pipe supplies the pressurized air to a combined auxiliary and emergency reservoir on each rail car. A control valve on each rail car senses pressure in the brake pipe to control actuation of the brake system on each rail car and re-charging of the combined reservoir.

For service braking, an operator slowly vents brake pipe pressure. For example, the operator may vent brake pipe pressure 6-8 pounds per square inch for minimum service reduction and 26 pounds per square inch for full service reduction. The control valve on each rail car senses the reduction in brake pipe pressure and repositions to supply a proportional air pressure from the auxiliary reservoir to a brake cylinder to actuate brake shoes on the rail car. To release the brakes, the operator charges air from the main reservoir to the brake pipe to increase brake pipe pressure. When the control valve on each rail car senses an increase in brake pipe pressure, the control valve repositions to vent brake cylinder pressure through a retaining valve to atmosphere to release the brake shoes. The control valve also repositions to allow brake pipe pressure to re-charge the auxiliary reservoir.

For emergency braking, the operator rapidly vents brake pipe pressure. When any control valve senses a sufficiently rapid reduction in brake pipe pressure, the control valve repositions to supply air pressure from the auxiliary and emergency reservoirs to the brake cylinder to actuate the brake shoes. In addition, the control valve repositions to vent brake pipe pressure locally to more rapidly propagate emergency braking to other rail cars in the train.

The retaining valve on each rail car selectively controls the release of brake cylinder pressure to atmosphere. The retaining valve allows the brake system to maintain a limited braking force when descending long grades while also allowing the brake pipe and associated reservoirs to be recharged for a subsequent brake application. The standard retaining valve is a manually operated, three-position valve, with the functionality of each position prescribed by the AAR Manual of Standards and Recommended Practices Brakes and Brake Equipment, Standard S-446. One position is the Direct Exhaust (EX) position in which the retaining valve rapidly vents brake cylinder pressure to atmosphere, providing a pressure blowdown from 70 psi to 10 psi in not more than 3 seconds. Another position is the Slow Direct Exhaust (SD) position in which the retaining valve slowly vents brake cylinder pressure to atmosphere, providing a pressure blowdown from 60 psi to 40 psi in 17 to 22 seconds. The third position is the HP Retain (HP) position in which the retaining valve slowly vents brake cylinder pressure to atmosphere until the brake cylinder pressure reaches 16-22 psi.

Continuous exposure and operation in the harsh environments associated with railroads accelerates wear of the retaining valve, requiring frequent inspections to repair or replace worn components. The number of internal components and precise fitting between these internal components further complicates the inspection and repairs. As a result, the need exists for an improved retaining valve that is easier to inspect and repair.

BRIEF DESCRIPTION OF THE INVENTION

Aspects and advantages of the invention are set forth below in the following description, or may be obvious from the description, or may be learned through practice of the invention.

One embodiment of the present invention is a retaining valve for a rail car brake system that includes an inlet, an outlet downstream from the inlet, and a fluid pathway between the inlet and outlet. A valve member in the fluid pathway between the inlet and outlet has first, second, and third positions. A first passage through the valve member is aligned with the outlet to allow fluid flow from the inlet, through the first passage, to the outlet when the valve member is in the first position. A second passage through the valve member is aligned with the outlet to allow fluid flow from the inlet, through the second passage, to the outlet when the valve member is in the second position. A third passage through the valve member is aligned with the outlet to allow fluid flow from the inlet, through the third passage, to the outlet when the valve member is in the third position. A slide moves with respect to the valve member in response to pressure at the inlet. A spring engaged with the slide biases the slide toward the inlet. A seal located at an axial midpoint of the slide prevents flow through the third passage when pressure at the inlet is less than a predetermined pressure.

In another embodiment of the present invention, a retaining valve for a rail car brake system includes a valve body that defines an inlet and an outlet. A handle engaged with the valve body can rotate with respect to the valve body between first, second, and third positions. A valve member is operably connected to the handle and at least partially inside the valve body so that rotation of the handle rotates the valve member with respect to the valve body. A first passage through the valve member is aligned with the outlet to provide a fluid pathway from the inlet, through the first passage, to the outlet when the handle is in the first position. A second passage through the valve member is aligned with the outlet to provide a fluid pathway from the inlet, through the second passage, to the outlet when the handle is in the second position. A third passage through the valve member is aligned with the outlet to provide a fluid pathway from the inlet, through the third passage, to the outlet when the handle is in the third position. A slide inside the valve body moves with respect to the valve member in response to pressure at the inlet to the valve body. A spring engaged with the slide biases the slide toward the inlet of the valve body. A seal located at an axial midpoint of the slide between the slide and the valve member prevents flow through the third passage when pressure at the inlet of the valve body is less than a predetermined pressure.

Another embodiment of the present invention is a retaining valve for a rail car brake system that includes an inlet and a valve member downstream from the inlet, wherein the valve member has first, second, and third positions. A first passage through the valve member allows fluid flow from the inlet through the retaining valve when the valve member is in the first position. A second passage through the valve member allows fluid flow from the inlet through the retaining valve when the valve member is in the second position. A third passage through the valve member allows fluid flow from the inlet through the retaining valve when the valve member is in the third position. A slide moves with respect to the valve member in response to pressure at the inlet. A spring engaged with the slide biases the slide toward the inlet. A seal located at an axial midpoint of the slide prevents flow through the third passage when pressure at the inlet is less than a predetermined pressure.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
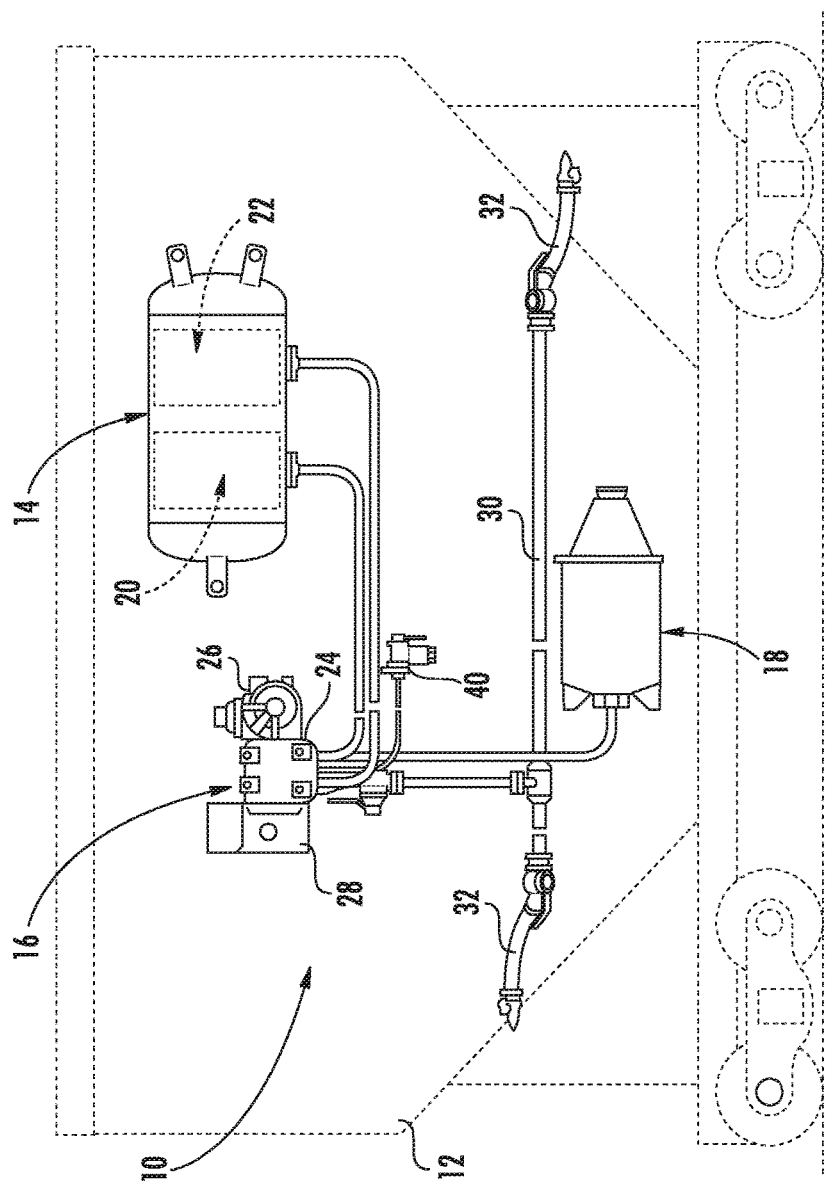
FIG. 1 is a simplified block diagram of a conventional brake system in a rail car.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A.

FIG. 1 provides a simplified block diagram of a conventional brake system 10 in a rail car 12. As shown in FIG. 1, each rail car 12 generally includes a combined reservoir 14, a control valve 16, and a brake cylinder 18. The combined reservoir 14 generally includes an auxiliary reservoir 20 separated from an emergency reservoir 22. The control valve 16 generally includes a pipe bracket 24 that provides fluid communication between a service portion 26 and an emergency portion 28. A brake pipe 30 supplies pressurized air to the control valve 16, and hoses 32 serially connect each brake pipe 30 in each rail car 10.

The brake cylinder 18, auxiliary reservoir 20, emergency reservoir 22, and brake pipe 30 operably connect to the pipe bracket 24 to supply or receive pressurized air from the pipe bracket 24. The service portion 26 of the control valve 16 continuously monitors brake pipe 30 pressure to detect a request for service braking and direct pressurized air from the auxiliary reservoir 20 to the brake cylinder 18 to apply service braking. The emergency portion 28 of the control valve 16 compares the rate of change of brake pipe 30 pressure to detect a request for emergency braking and direct pressurized air from the auxiliary reservoir 20 and the emergency reservoir 22 to the brake cylinder 18 to apply emergency braking.

As shown in FIG. 1, the brake system 10 further includes a three-position retaining valve 40 connected to the pipe bracket 24. The control valve 16 provides a fluid pathway between the brake cylinder 18 and the retaining valve 40 to allow to vent pressure from the brake cylinder 18 through the retaining valve 40 to atmosphere, depending on the particular position of the retaining valve 40. The three positions of the retaining valve 40 are Direct Exhaust (EX), Slow Direct Exhaust (SD), and HP Retain (HP), as previously discussed with respect to AAR Standard S-446.

Figure 2:
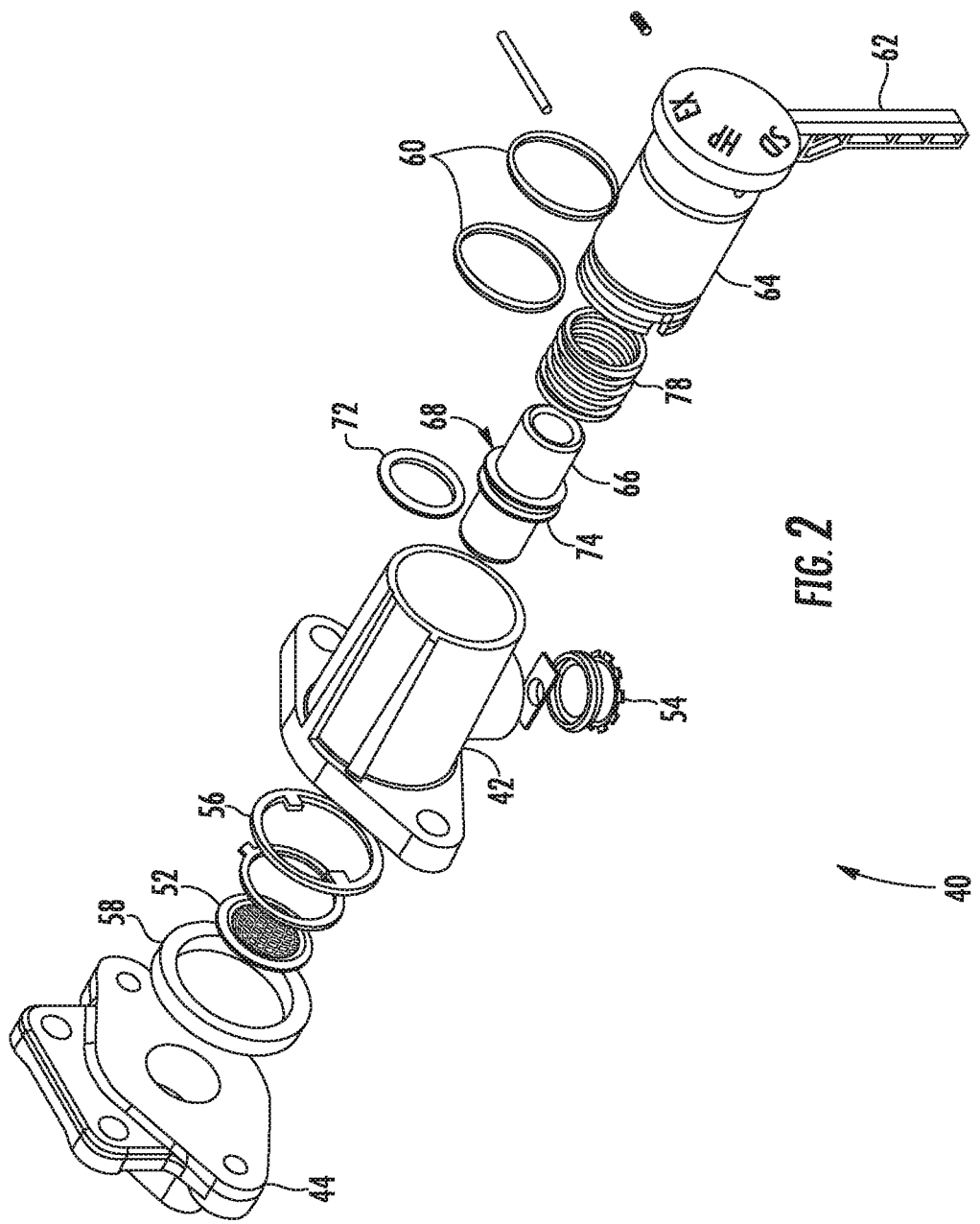
FIG. 2 is an exploded perspective view of a retaining valve according to one embodiment of the present invention.

FIG. 2 provides an exploded perspective view of the retaining valve 40 according to one embodiment of the present invention. As shown in FIG. 2, a valve body 42 allows the retaining valve 40 to be attached to a mounting bracket 44 or other suitable attachment point. As used herein, the term "valve body" means "an outer casing that contains the internal parts of a valve." As shown more clearly in FIGS. 3-12, the valve body 42 generally defines an inlet 46 and an outlet 48 that provide a fluid pathway 50 through the retaining valve 40. An inlet filter 52 and an outlet filter 54 at the inlet 46 and outlet 48, respectively, may prevent contaminates from entering the valve body 42. One or more retaining rings 56 may hold the internal parts inside the valve body 42, and a gasket 58 or O-rings 60 may provide an air-tight boundary for fluid flow through the retaining valve 40.

As shown in FIG. 2, a handle 62 may engage with the valve body 42 so that the handle 62 can rotate with respect to the valve body 42 between the Direct Exhaust (EX), Slow Direct Exhaust (SD), and HP Retain (HP) positions. The handle 62 may operably connect with a valve member 64 inside the valve body 42 so that rotation of the handle 62 rotates the valve member 64 with respect to the valve body 42 in the fluid pathway between the inlet 46 and outlet 48. In this manner, the valve member 64 has first, second, and third positions corresponding with the EX, SD, and HP positions, respectively, of the handle 62.

A slide 66 may be located inside the valve body 42 to move axially with respect to the valve body 42 and valve member 64. To facilitate maintenance, the slide 66 is symmetrical about an axial midpoint 68, making it impossible to improperly install the slide 66 in the valve body 42. As used herein, the term "symmetrical" means that the geometry and surface area of the slide 66 on each side of the axial midpoint is substantially the same so that the function and operation of the slide 66 inside the valve body 42 does not change depending on which side of the slide 66 faces the inlet 46 of the valve body 42. For example, as shown in FIG. 2, the slide may include a cylindrical shape on each side of the axial midpoint 68 so that either end of the slide 66 may face the inlet 46 of the valve body 42 without changing the function and operation of the slide 66 or the retaining valve 40.

A seal 70 may be located at the axial midpoint 68 between the valve member 64 and the slide 66. As shown in FIG. 2, for example, the seal 70 may include an O-ring 72 that resides in a groove 74 in the slide 66. As will be described with respect to FIGS. 3-12, the valve member 64, slide 66, and seal 68 cooperate to form a barrier 76 that prevents fluid flow past the barrier 76. A spring 78 or other biasing device may be engaged with the slide 66 to bias the slide 66 toward the inlet 46, and pressure at the inlet 46 applies force to the barrier 76 to overcome the spring 78 bias and move the slide 66 with respect to the valve member 64.

Figure 3:
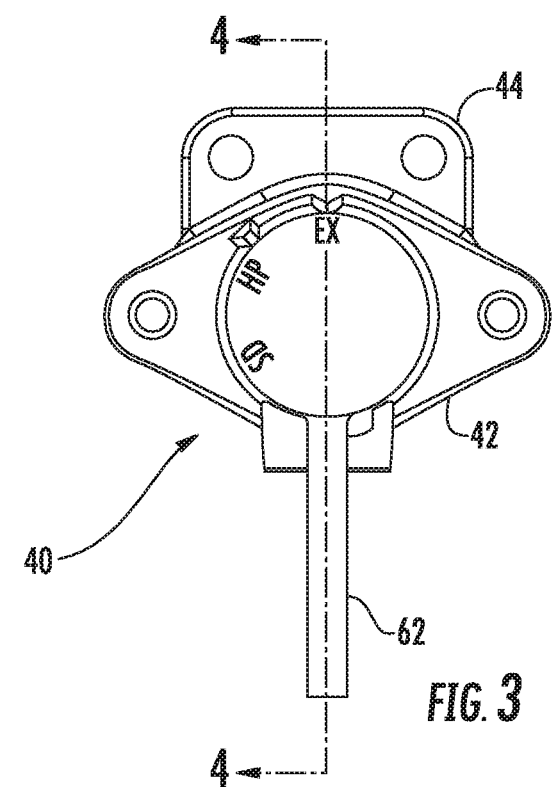
FIG. 3 is a top plan view of the retaining valve shown in FIG. 2 in the Direct Exhaust (EX) position.
Figure 4:
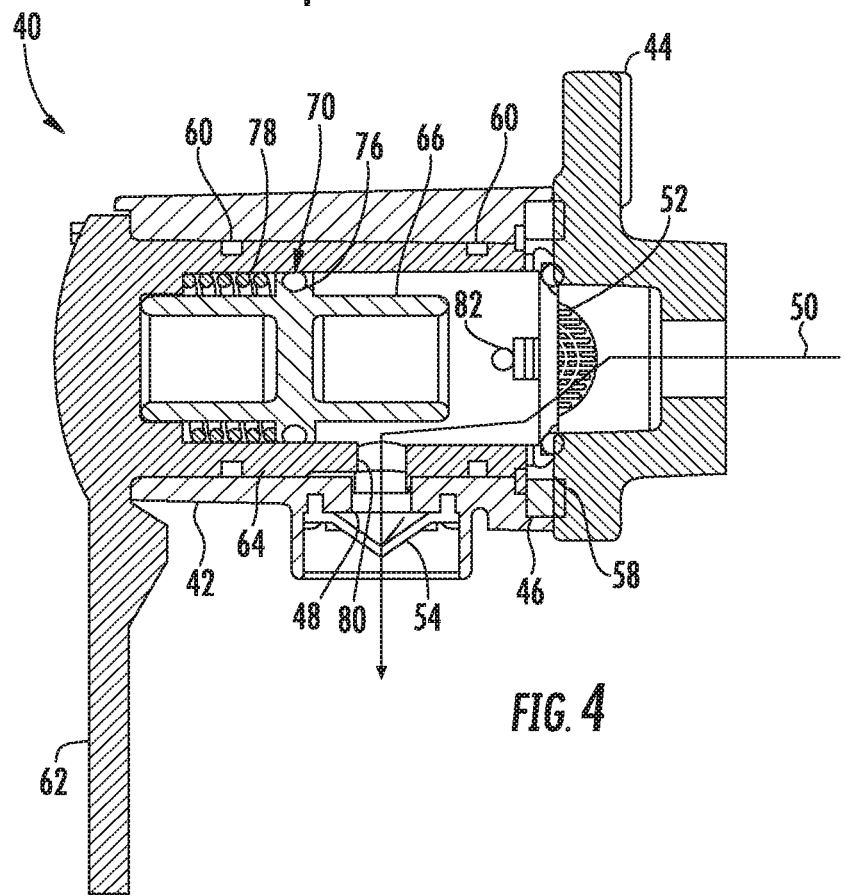
FIG. 4 is a cross-section view of the retaining valve shown in FIG. 3 taken along line 4-4 with the spring fully compressed.
Figure 5:
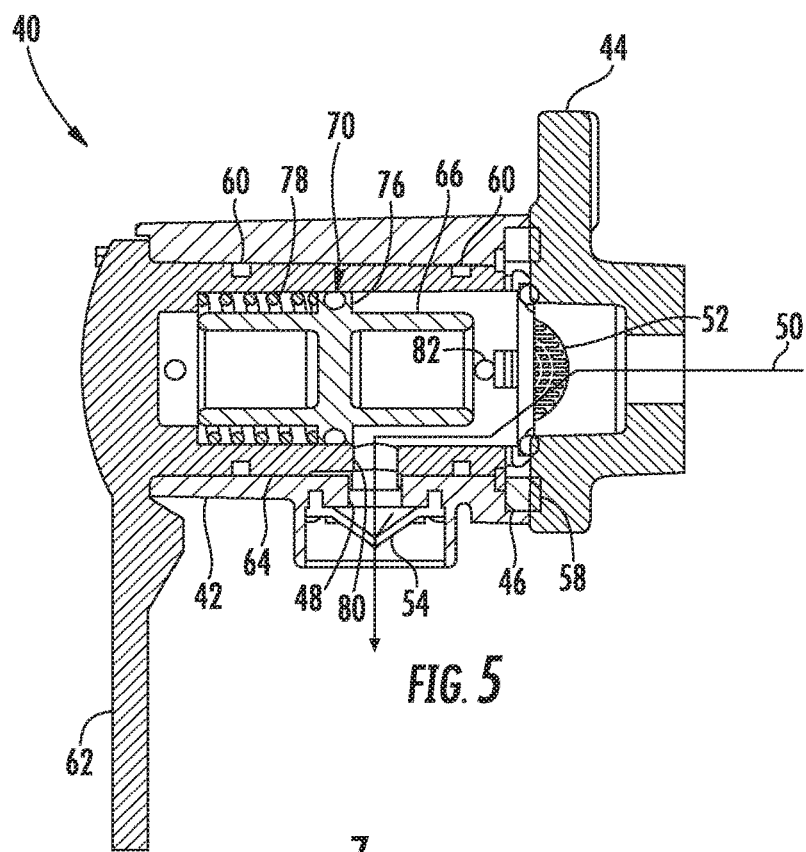
FIG. 5 is a cross-section view of the retaining valve shown in FIG. 3 taken along line 4-4 with the spring fully extended.

FIG. 3 provides a top plan view of the retaining valve 40 shown in FIG. 2 in the first or Direct Exhaust (EX) position, and FIGS. 4 and 5 provide cross-section views of the retaining valve 40 shown in FIG. 3 taken along line 4-4 when the spring 78 is fully compressed or fully extended, respectively. In the EX position, the handle 62 aligns a first passage 80 through the valve member 64 with the outlet 48. As a result, the fluid pathway 50 allows fluid flow from the inlet 46, through the first passage 80, to the outlet 48. In particular embodiments, the first passage 80 may have a cross-sectional area that enables the retaining valve 40 to provide a pressure blowdown from 70 psi to 10 psi in not more than 3 seconds.

As pressure at the inlet 46 increases, the force applied to the barrier 76 overcomes the spring 78 bias to move the slide 66 to the left and compress the spring 78 as shown in FIG. 4. As pressure at the inlet 46 decreases, the spring 78 bias overcomes the force applied to the barrier 76 to move the slide 66 to the right and extend the spring 78 as shown in FIG. 5. A stop 82 engages with the slide 66 to limit rightward movement of the slide 66 and thereby ensure that the fluid pathway 50 through the first passage 80 exists for any pressure at the inlet 46 while the retaining valve 40 is in the first or Direct Exhaust (EX) position.

Figure 6:
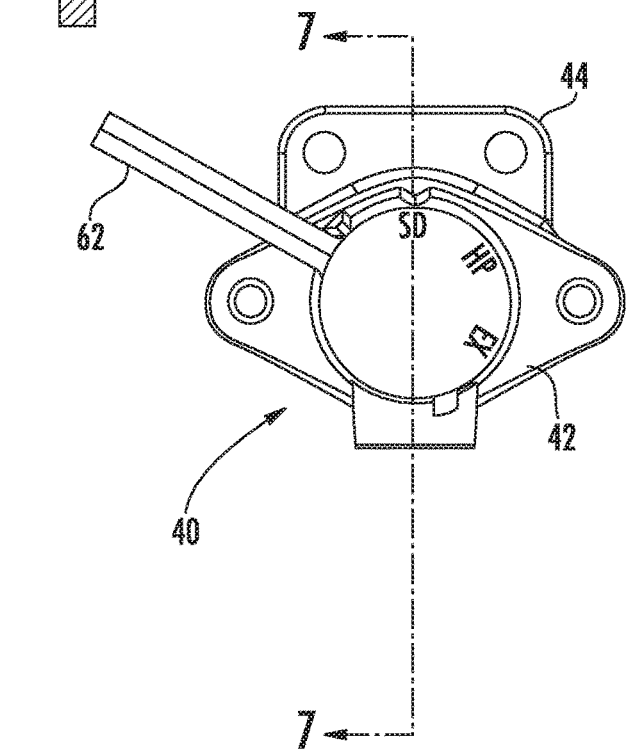
FIG. 6 is a top plan view of the retaining valve shown in FIG. 2 in the Slow Direct Exhaust (SD) position.
Figure 7:
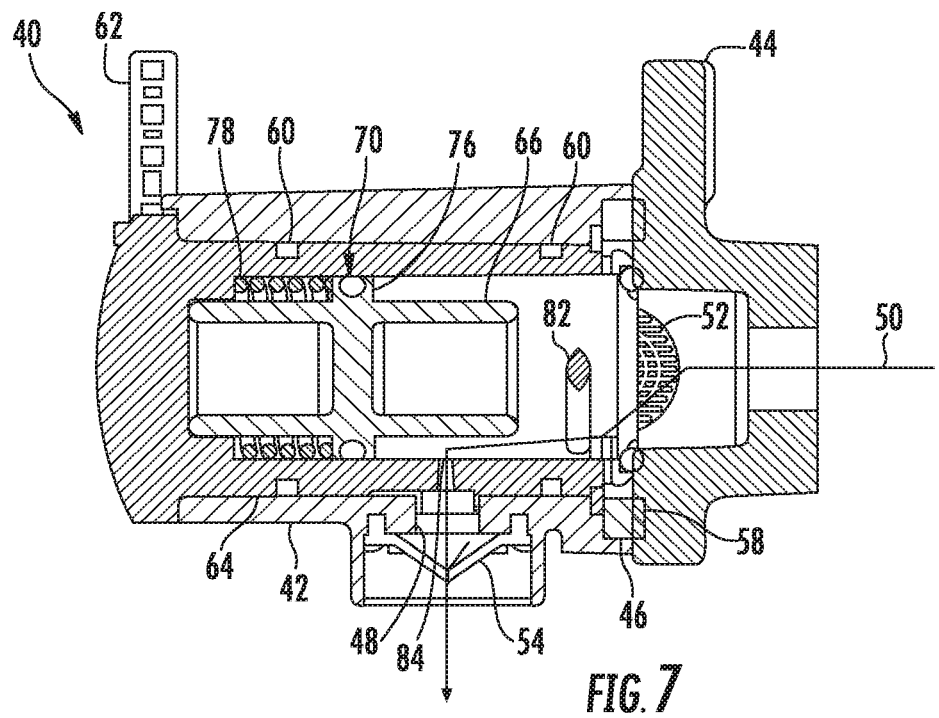
FIG. 7 is a cross-section view of the retaining valve shown in FIG. 6 taken along line 7-7 with the spring fully compressed.
Figure 8:
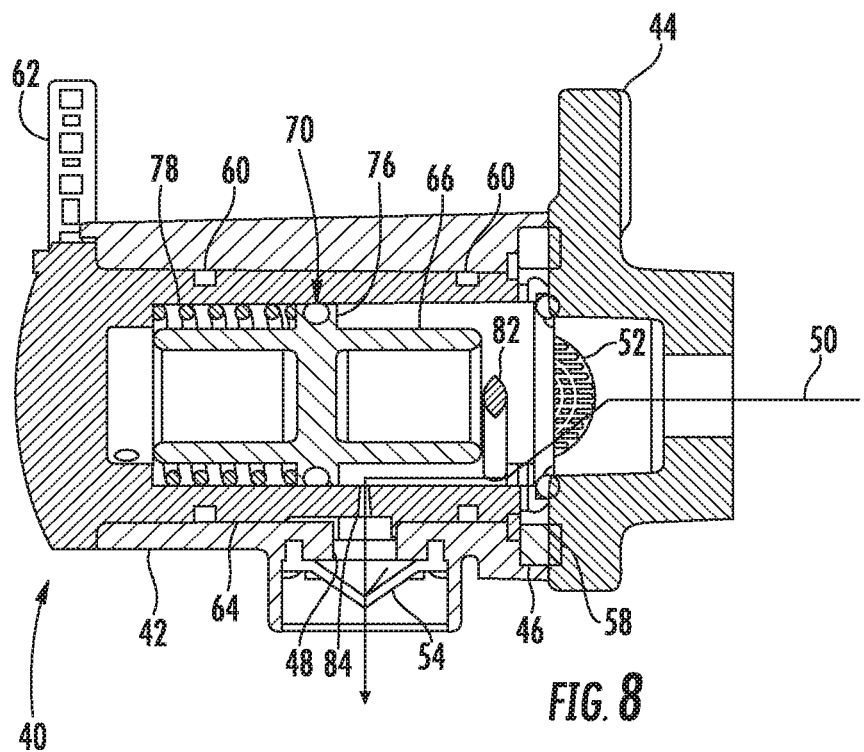
FIG. 8 is a cross-section view of the retaining valve shown in FIG. 6 taken along line 7-7 with the spring fully extended.

FIG. 6 provides a top plan view of the retaining valve 40 shown in FIG. 2 in the second or Slow Direct Exhaust (SD) position, and FIGS. 7 and 8 provide cross-section views of the retaining valve 40 shown in FIG. 6 taken along line 7-7 when the spring 78 is fully compressed or fully extended, respectively. In the SD position, the handle 62 aligns a second passage 84 through the valve member 64 with the outlet 48. As a result, the fluid pathway 50 allows fluid flow from the inlet 46, through the second passage 84, to the outlet 48. In particular embodiments, the second passage 84 may have a smaller cross-sectional area than the first passage 80 to provide a pressure blowdown from 60 psi to 40 psi in 17 to 22 seconds.

As pressure at the inlet 46 increases, the force applied to the barrier 76 overcomes the spring 78 bias to move the slide 66 to the left and compress the spring 78 as shown in FIG. 7. As pressure at the inlet 46 decreases, the spring 78 bias overcomes the force applied to the barrier 76 to move the slide 66 to the right and extend the spring 78 as shown in FIG. 8. The stop 82 engages with the slide 66 to limit rightward movement of the slide 66 and thereby ensure that the fluid pathway 50 through the second passage 84 exists for any pressure at the inlet 46 while the retaining valve 40 is in the second or Slow Direct Exhaust (SD) position.

Figure 9:
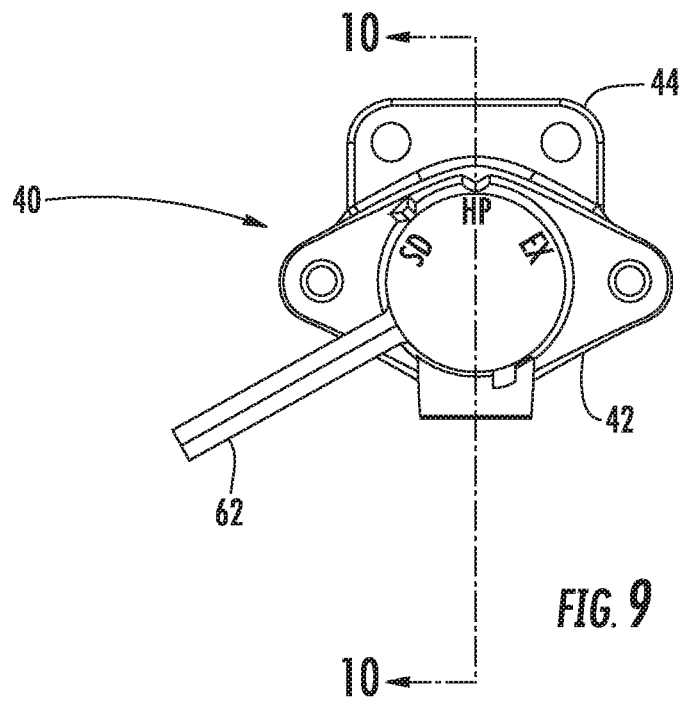
FIG. 9 is a top plan view of the retaining valve shown in FIG. 2 in the High Pressure Retain (HP) position.
Figure 10:
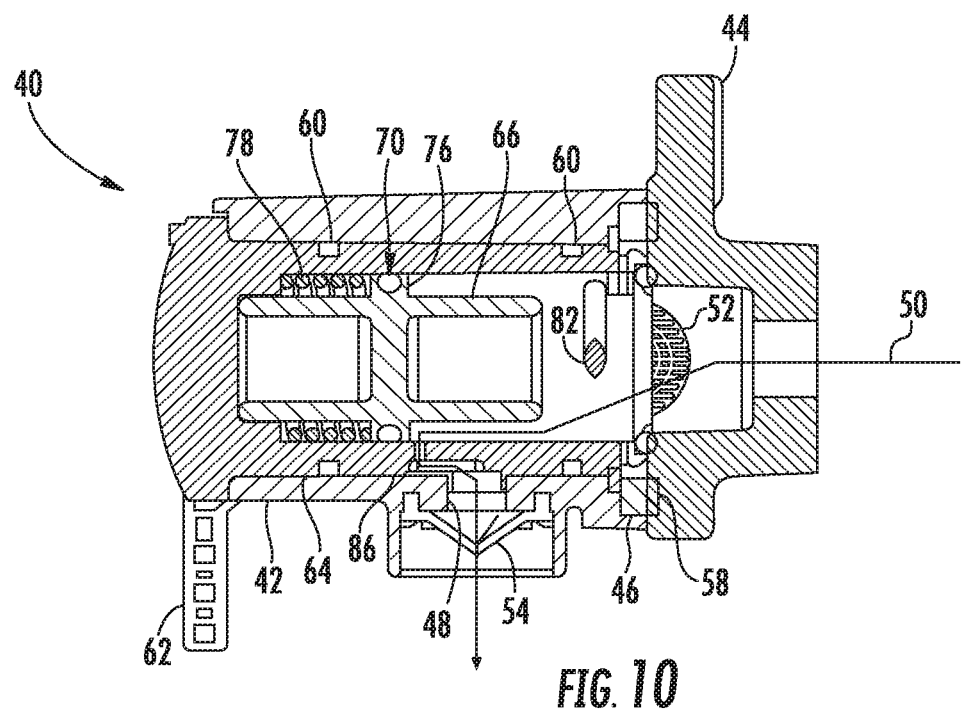
FIG. 10 is a cross-section view of the retaining valve shown in FIG. 9 taken along line 9-9 with the spring fully compressed.
Figure 11:
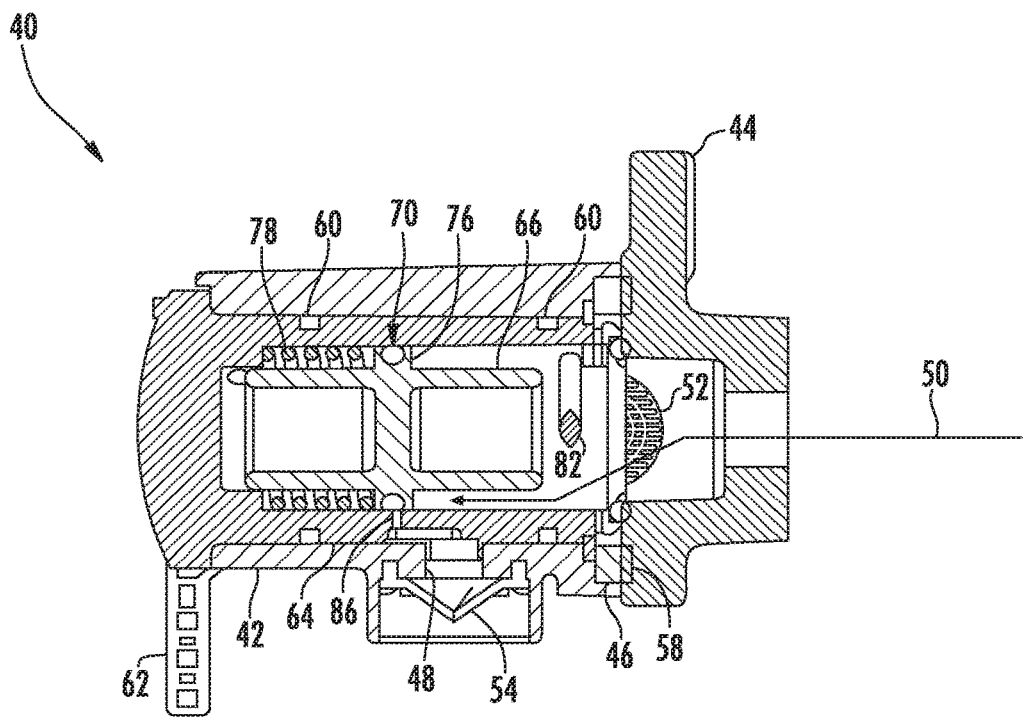
FIG. 11 is a cross-section view of the retaining valve shown in FIG. 9 taken along line 9-9 when brake cylinder pressure is below a predetermined pressure.
Figure 12:
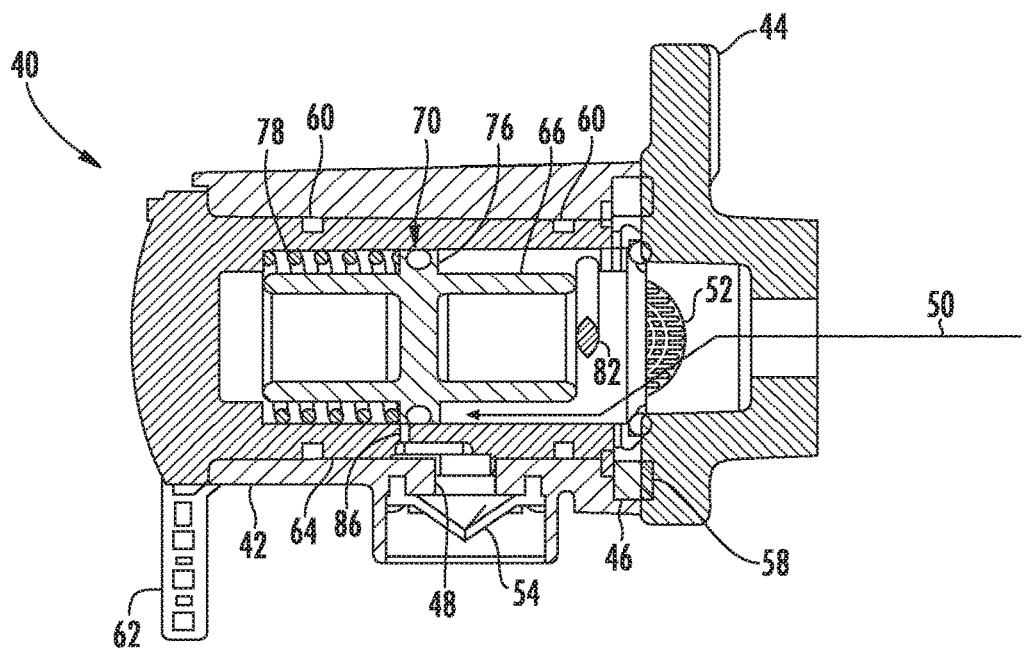
FIG. 12 is a cross-section view of the retaining valve shown in FIG. 9 taken along line 9-9 with the spring fully extended.

FIG. 9 provides a top plan view of the retaining valve 40 shown in FIG. 2 in the third or High Pressure Retain (HP) position, and FIGS. 10-12 provide cross-section views of the retaining valve 40 shown in FIG. 9 taken along line 10-10 when the spring 78 is fully compressed, when brake cylinder pressure is below a predetermined pressure, or with the spring 78 fully extended, respectively. In the HP position, the handle 62 aligns a third passage 86 through the valve member 64 with the outlet 48. As a result, depending on the pressure at the inlet 46, the fluid pathway 50 allows fluid flow from the inlet 46, through the third passage 86, to the outlet 48. In particular embodiments, the third passage 86 may have a smaller cross-sectional area than the first and/or second passages 80, 84 to provide a pressure blowdown from 60 psi to 40 psi in 33 to 43 seconds.

As pressure at the inlet 46 increases, the force applied to the barrier 76 overcomes the spring 78 bias to move the slide 66 to the left and compress the spring 78. When pressure at the inlet 46 is above a predetermined pressure, the fluid pathway 50 allows fluid flow from the inlet 46, through the third passage 86, to the outlet 48, as shown in FIG. 10. As pressure at the inlet 46 decreases, the spring 78 bias overcomes the force applied to the barrier 76 to move the slide 66 to the right and extend the spring 78 as shown in FIGS. 11 and 12. When pressure at the inlet 46 decreases to the predetermined pressure, rightward movement of the slide 66 causes the seal 70 located at the axial midpoint 68 of the slide 66 to block the third passage 86, preventing further fluid flow from the inlet 46, through the third passage 86, to the outlet 48, as shown in FIG. 11. In particular embodiments, the predetermined pressure may be not less than 16 psi nor more than 22 psi. At inlet 46 pressures below the predetermined pressure, the barrier 76 formed by the cooperation between the valve member 64, slide 66, and seal 70 prevents fluid flow from reaching the third passage, blocking further fluid flow through the retaining valve 40, as shown in FIGS. 11 and 12.

As shown in FIGS. 3-12, the location of the seal 70 and/or symmetric design of the slide 66 facilitates inspection, maintenance, and operation of the retaining valve 40 by preventing the slide 66 from being incorrectly installed in the retaining valve 40. As described with respect to FIGS. 3-12, the retaining valve 40 will function and operate the same regardless of the orientation of the slide 66 inside the valve body 42. This feature will reduce the likelihood that incorrect assembly of the retaining valve 40 will adversely affect the function and operation of the retaining valve 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A retaining valve for a rail car brake system, comprising:
   an inlet;
   an outlet downstream from said inlet;
   a fluid pathway between said inlet and said outlet;
   a valve member in said fluid pathway between said inlet and said outlet, wherein said valve member has first, second, and third positions;
   a first passage through said valve member, wherein said first passage is aligned with said outlet to allow fluid flow from said inlet, through said first passage, to said outlet when said valve member is in said first position;
   a second passage through said valve member, wherein said second passage is aligned with said outlet to allow fluid flow from said inlet, through said second passage, to said outlet when said valve member is in said second position;
   a third passage through said valve member, wherein said third passage is aligned with said outlet to allow fluid flow from said inlet, through said third passage, to said outlet when said valve member is in said third position;
   a slide that moves with respect to said valve member in response to pressure at said inlet;
   a spring engaged with said slide that biases said slide toward said inlet; and
   a seal located at an axial midpoint of said slide, wherein said seal prevents flow through said third passage when pressure at said inlet is less than a predetermined pressure;
   wherein said slide is symmetrical about said axial midpoint.

2. The retaining valve as in claim 1, wherein said valve member, slide, and seal cooperate to form a barrier that prevents fluid flow past said barrier.

3. The retaining valve as in claim 1, wherein said seal is located between said slide and said valve member.

4. The retaining valve as in claim 1, wherein said first passage has a larger cross-sectional area than either of said second passage or said third passage.

5. The retaining valve as in claim 1, wherein said third passage has a smaller cross-sectional area than either of said first passage or said second passage.

6. A retaining valve for a rail car brake system, comprising:
   a valve body, wherein said valve body defines an inlet and an outlet;
   a handle engaged with said valve body, wherein said handle can rotate with respect to said valve body between first, second, and third positions;
   a valve member operably connected to said handle and at least partially inside said valve body, wherein rotation of said handle rotates said valve member with respect to said valve body;
   a first passage through said valve member, wherein said first passage is aligned with said outlet to provide a fluid pathway from said inlet, through said first passage, to said outlet when said handle is in said first position;
   a second passage through said valve member, wherein said second passage is aligned with said outlet to provide a fluid pathway from said inlet, through said second passage, to said outlet when said handle is in said second position;
   a third passage through said valve member, wherein said third passage is aligned with said outlet to provide a fluid pathway from said inlet, through said third passage, to said outlet when said handle is in said third position;
   a slide inside said valve body, wherein said slide moves with respect to said valve member in response to pressure at said inlet to said valve body;
   a spring engaged with said slide that biases said slide toward said inlet of said valve body; and
   a seal located at an axial midpoint of said slide between said slide and said valve member, wherein said seal prevents flow through said third passage when pressure at said inlet of said valve body is less than a predetermined pressure;
   wherein said slide is symmetrical about said axial midpoint.

7. The retaining valve as in claim 6, wherein said valve member, slide, and seal cooperate to form a barrier that prevents fluid flow past said barrier.

8. The retaining valve as in claim 6, wherein said first passage has a larger cross-sectional area than either of said second passage or said third passage.

9. The retaining valve as in claim 6, wherein said third passage has a smaller cross-sectional area than either of said first passage or said second passage.

10. A retaining valve for a rail car brake system, comprising:
    an inlet;
    a valve member downstream from said inlet, wherein said valve member has first, second, and third positions;
    a first passage through said valve member, wherein said first passage allows fluid flow from said inlet through said retaining valve when said valve member is in said first position;
    a second passage through said valve member, wherein said second passage allows fluid flow from said inlet through said retaining valve when said valve member is in said second position;
    a third passage through said valve member, wherein said third passage allows fluid flow from said inlet through said retaining valve when said valve member is in said third position;
    a slide that moves with respect to said valve member in response to pressure at said inlet;
    a spring engaged with said slide that biases said slide toward said inlet; and
    a seal located at an axial midpoint of said slide, wherein said seal prevents flow through said third passage when pressure at said inlet is less than a predetermined pressure;
    wherein said slide is symmetrical about said axial midpoint.

11. The retaining valve as in claim 10, wherein said valve member, slide, and seal cooperate to form a barrier that prevents fluid flow past said barrier.

12. The retaining valve as in claim 10, wherein said seal is located between said slide and said valve member.

13. The retaining valve as in claim 10, wherein said first passage has a larger cross-sectional area than either of said second passage or said third passage.

14. The retaining valve as in claim 10, wherein said third passage has a smaller cross-sectional area than either of said first passage or said second passage.

\* \* \* \* \*